United States Patent
Jiang et al.

(10) Patent No.: US 7,503,413 B2
(45) Date of Patent: Mar. 17, 2009

(54) SYSTEM AND METHOD FOR CONTROLLING STOPPING AND STARTING OF A VEHICLE ENGINE

(75) Inventors: Fangjun Jiang, Belleville, MI (US); Jonas A. Jerrelind, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 557 days.

(21) Appl. No.: 10/605,390

(22) Filed: Sep. 26, 2003

(65) Prior Publication Data

US 2005/0067200 A1  Mar. 31, 2005

(51) Int. Cl.
B60K 6/24 (2007.10)

(52) U.S. Cl. .................. 180/65.28; 903/905

(58) Field of Classification Search ........... 180/65.2, 180/65.3, 65.4; 701/22, 48; 903/941
See application file for complete search history.

(56) References Cited

U.S. PATENT DOCUMENTS

| | | | | |
|---|---|---|---|---|
| 4,335,429 A * | 6/1982 | Kawakatsu | .................. | 701/102 |
| 4,407,132 A * | 10/1983 | Kawakatsu et al. | ........... | 60/716 |
| 5,653,659 A * | 8/1997 | Kunibe et al. | ............... | 477/111 |
| 5,785,138 A | 7/1998 | Yoshida | | |
| 5,806,617 A * | 9/1998 | Yamaguchi | ................ | 180/65.2 |
| 6,077,186 A | 6/2000 | Kojima et al. | | |
| 6,176,807 B1 | 1/2001 | Oba et al. | | |
| 6,196,344 B1 | 3/2001 | Tamor | | |
| 6,201,312 B1 | 3/2001 | Shioiri et al. | | |
| 6,301,529 B1 | 10/2001 | Itoyama et al. | | |
| 6,321,143 B1 | 11/2001 | Phillips et al. | | |
| 6,336,889 B1 | 1/2002 | Oba et al. | | |
| 6,364,807 B1 | 4/2002 | Koneda et al. | | |
| 6,484,833 B1 * | 11/2002 | Chhaya et al. | ............. | 180/65.4 |
| 6,676,565 B2 * | 1/2004 | Mizutani | .................... | 477/111 |
| 6,895,744 B2 | 5/2005 | Osawa | | |
| 2002/0019687 A1 | 2/2002 | Suzuki et al. | | |
| 2002/0119080 A1 * | 8/2002 | Imada et al. | ................ | 422/168 |

FOREIGN PATENT DOCUMENTS

| | | |
|---|---|---|
| EP | 0 570 234 B1 | 11/1999 |
| EP | 1 391 338 B1 | 5/2005 |
| JP | 8-317506 | 11/1996 |

\* cited by examiner

*Primary Examiner*—Frank B Vanaman
(74) *Attorney, Agent, or Firm*—David B. Kelley; Brooks Kushman P.C.

(57) ABSTRACT

A method is provided for determining when to allow a vehicle engine to be placed in an engine standby mode. Various conditions, such as driver-controlled conditions, vehicle conditions, and energy management conditions, are compared to corresponding predetermined conditions. If at least some of the conditions match their corresponding predetermined conditions, the vehicle engine is allowed to be placed in a standby mode.

20 Claims, 4 Drawing Sheets

SYSTEM AND METHOD FOR CONTROLLING STOPPING AND STARTING OF A VEHICLE ENGINE

BACKGROUND OF INVENTION

1. Field of the Invention

The present invention relates to a system and method for controlling stopping and starting of a vehicle engine.

2. Background Art

The introduction of new vehicle types—e.g., hybrid electric vehicles—has enabled a number of systems and methods for saving fuel and reducing emissions. Hybrid electric vehicles can save fuel and reduce emissions through a number of methods, such as downsizing the engine, collecting regenerative power during braking, and implementing an engine stop/start function.

The engine stop/start function involves controlling the stopping and starting of the engine while the vehicle is in operation. In a conventional vehicle, the engine runs continuously once it is started by the driver. The engine provides torque to drive the vehicle and a number of onboard devices, such as compressors and pumps. The engine also provides torque to drive the alternator, which generates electricity to charge the battery and to run various electrical subsystems within the vehicle. Depending on different driving conditions, the engine may run at high speeds—i.e., 3,000-7,000 revolutions per minute (rpm)—or at very low speeds, perhaps as low as a few hundred rpm.

Unless the driver specifically shuts the engine off, the engine in a conventional vehicle will continue to run even when the vehicle is completely stopped. While the vehicle is stopped, the engine continues to run, or idle, partly because certain vehicle subsystems continue to require power. For example, the transmission oil pump and power steering fluid pump require power even when the vehicle has stopped. In addition, certain driver-controlled subsystems, such as air conditioning and personal electronics, require power. The primary reason for keeping the engine running, even when the vehicle is stopped, is so that the vehicle is ready to move when the driver commands it to do so.

Even though the engine runs at low speeds when it idles, it nonetheless continues to burn fuel and exhaust emissions. Typically, the engine idle speed is kept as low as possible because the engine consumes less fuel at a lower speed. Thus, it would be desirable to shut the engine down if all of the vehicle and driver needs can still be met. Of course, when there are driver or vehicle requests, the engine would need to be able to start without any noticeable disturbance to the driver or the vehicle. This function may generally be called the stop/start function of the engine.

In a conventional vehicle the engine is started by a relatively small motor, called the starter, which is often powered by a battery. In such a vehicle, it may be hard to implement an engine stop/start function because the capacity of the battery may not be large enough to supply sustained power to all of the vehicle subsystems when the engine is shut down. Moreover, a typical starter may not be able to start the engine quickly enough to respond to a driver's demand to move the vehicle.

New developments in battery technology have increased the battery capacity while reducing the battery size and weight, thereby making it possible to meet the entire driver and vehicle system needs with electric power for a limited amount of time. In addition, the advances in motor technology and power electronics make it practical for the vehicle to use more powerful motors and use them more efficiently. Depending on the configurations, a battery and motor system in a vehicle with today's technology can start the engine almost instantaneously, or even drive the vehicle independently. All these advances make it viable to develop the engine stop/start function.

There are many possible configurations, and thus, many classifications for hybrid electric vehicles. Two broad classifications are mild hybrids and full hybrids. The distinction is whether the motor alone can drive the vehicle. In a mild hybrid electric vehicle, the motor is not powerful enough to drive the vehicle. The engine, once stopped, has to be started if the driver wants to launch the vehicle. By contrast, the motor in a full hybrid electric vehicle can drive the vehicle, though there may be limits on the vehicle speed that can be achieved. An engine stop/start function can be a major contributor for saving fuel and reducing emissions, whether the vehicle is a mild hybrid, a full hybrid, or a non-hybrid vehicle that has an engine and a second power source. Thus it is desirable to have a systematic approach for controlling the engine stopping and starting for various vehicle configurations.

One attempt to provide a drive control system for a hybrid vehicle is found in U.S. Pat. No. 6,201,312 issued to Shioiri et al. on Mar. 13, 2001. Shioiri et al. describes a control system for improving the fuel economy of a hybrid vehicle. Specifically, the control system provides for running the vehicle either with an electric motor or an internal combustion engine, where the selection between the two is made on the basis of a comparison of the two fuel economies. The control system of Shioiri et al. calculates an overall vehicle power demand, and uses this calculation to determine whether it is more efficient to run the vehicle with the motor or the engine. When it is determined that it is more fuel efficient to run the vehicle with the motor, the engine is stopped and the motor is used to run the vehicle. This is only done, however, if the battery state of charge is at least at a predetermined minimum level.

What Shioiri et al. does not consider is that there may be times when it is undesirable to stop the engine, even if it is more fuel efficient to run the vehicle with the motor. For example, it may be undesirable to have the engine cycle on and off too frequently. Thus, an improved control system would provide a mechanism for minimizing the possibility of a short engine on/off cycle. Moreover, if an electrical fault is detected in the motor, it may not be available to run the vehicle after the engine is stopped. Similarly, it may be desirable to consider driver inputs, such as a brake pedal position or gear shift position, when deciding whether to stop the engine. It may also be useful to examine other vehicle subsystems not only for their power consumption, but also for other operating conditions.

Another attempt to provide a controller for a hybrid electric vehicle is described in U.S. patent app. Pub. No. 20020019687, published by Suzuki, et al. on Feb. 14, 2002. Suzuki et al. describes a vehicle controller and vehicle control method for a hybrid electric vehicle. A number of conditions are examined to determine when to start and stop the vehicle engine. For example, if the "startability" of the engine is degraded, a flag may be set inhibiting the stopping of the engine in an idle state. The determination of whether the engine startability is degraded is based on systems external to the engine, rather than the engine itself. For example, the state of the battery charge may be examined, or whether an engine starting system—e.g., an electric motor—has failed.

Accordingly, there exists a need for a system and method for controlling a vehicle such that it is possible to examine a number of different operating conditions, including conditions of the vehicle engine, and compare these conditions to corresponding predetermined conditions, and to stop the engine only if one or more of the operating conditions matches its corresponding predetermined condition.

SUMMARY OF INVENTION

Therefore, a method is provided for determining when to stop an engine in a vehicle having a second power source. The method includes comparing at least one engine condition to a corresponding predetermined engine condition, thereby generating a first flag. At least one vehicle system controller condition is compared to a corresponding predetermined vehicle system controller condition, thereby generating a second flag. At least one second power source condition is compared to a corresponding predetermined second power source condition, thereby generating a third flag. The engine is stopped when at least one of the flags indicates an engine stop condition.

The invention also provides a method for enabling engine standby in a vehicle having an engine, a motor, and a battery. The method includes determining whether at least one engine condition matches a corresponding predetermined engine condition. It is further determined whether at least one vehicle system controller condition matches a corresponding predetermined vehicle system controller condition, and whether at least one battery condition matches a corresponding predetermined battery condition. Engine standby is enabled when at least one of the determined conditions matches a corresponding predetermined condition.

The invention further provides a system for enabling engine standby in a vehicle having an engine and a second power source. The system includes at least one controller configured to compare at least one condition of a set of conditions to a corresponding predetermined condition to generate a controller flag, and to enable engine standby when at least the controller flag indicates an engine standby enable condition.

The above object and other objects, features, and advantages of the present invention are readily apparent from the following detailed description of the best modes for carrying out the invention when taken in connection with the accompanying drawings.

DETAILED DESCRIPTION

Figure 1:
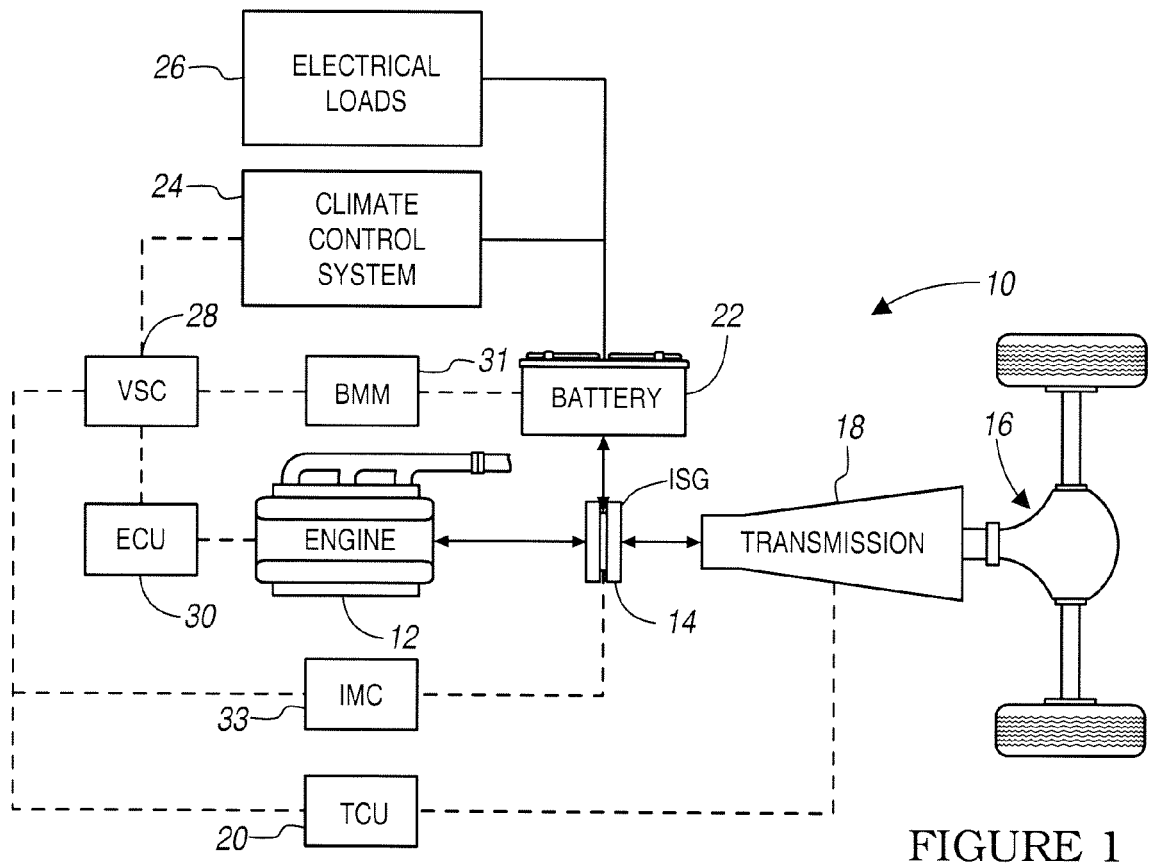
FIG. 1 is a schematic representation of a vehicle including a system in accordance with the present invention.

FIG. 1 shows a system 10 for controlling stopping and starting of a vehicle engine in accordance with the present invention. The vehicle, not shown in its entirety, includes an engine 12 and a motor, in this embodiment an integrated starter generator (ISG) 14, connected to the vehicle wheels 16 through a power transfer unit, such as transmission 18. A transmission control module (TCU) 20 is used to control the operation of the transmission 18. A battery 22 provides power to operate the ISG 14, and the ISG 14 may in turn, act as a generator to charge the battery 22. The battery 22 shown in FIG. 1, is a 42 volt battery, though batteries of different voltages and different capacities may be used.

At the outset, it is important to note that the vehicle configuration shown in FIG. 1 represents only one of many different vehicle configurations on which the system 10 may be used. The system 10 allows an engine, such as the engine 12, to be shut down, or placed in a standby mode, to save fuel and reduce exhaust emissions. In the engine standby mode, the engine must be ready for restart upon driver command, and while the engine is shut down, vehicle subsystems must be powered by another source. Thus, the system 10 can be used with any vehicle that has an engine and a second power source, such as the battery 22.

The system 10 may also be used with other vehicle configurations. For example, the system 10 may be applied to a vehicle with or without a transmission. It may be applied to a vehicle configured with different types of motors, generators or both. It may be applied to a vehicle with different types of power sources, such as a flywheel or an ultra-capacitor. Furthermore, it may also be applied to vehicles having any number of control modules.

The vehicle configuration shown in FIG. 1 represents a mild hybrid electric vehicle configuration. Both the engine 12 and the ISG 14 are connected to the vehicle wheels 16 to provide torque to drive the vehicle. The transmission 18 is used to transfer torque from the engine 12 and the ISG 14 to the vehicle wheels 16. Of course, other types of power transfer units could be used. For example, in some full hybrid electric vehicles the motor and engine could be connected through a planetary gear system having an output connected to the vehicle wheels.

In the embodiment shown in FIG. 1, the battery 22 provides electrical power to the ISG 14, a climate control system 24, as well as the other vehicle electrical loads 26. The electrical loads 26 may represent any number of vehicle electrical loads, including such things as the electric water pump, electric fans, the electric transmission oil pump, the vehicle headlights, radio, cigarette lighter, and other electrical devices. Of course, the specific electrical loads will depend on the vehicle configuration, and may vary among different vehicles.

In some alternative vehicle configurations, the ISG 14 may be replaced with a separate generator and a separate motor. In such a configuration, either the motor or the generator, or both, could be used to provide power to the vehicle electrical systems. A battery or other electrical storage device, such as an ultra-capacitor, may be used to provide the power to run the motor and other vehicle electrical devices. Thus, although the system 10 is described herein with reference to the vehicle configuration shown in FIG. 1, it may be used with many different types of vehicle configurations.

Returning to FIG. 1, it is seen that a controller, specifically, a vehicle system controller (VSC) 28, is connected to an engine control unit (ECU) 30, which is connected to the engine 12. Although the VSC 28 and the ECU 30 are shown in FIG. 1 as separate controllers, they may be integrated into a single hardware module. The VSC 28 shown in FIG. 1 is directly connected to the battery management module (BMM) 31, the climate control system 24, and the inverter motor controller (IMC) 33. The configuration shown in FIG.

1 includes a number of separate control modules, each configured to control one or more devices, and each in communication with the VSC 28. Alternatively, one or more of the control modules may be integrated into the VSC 28, or they may be conveniently included in another control module or modules already within the vehicle.

The system 10 provides an engine standby logic that is used to determine whether the engine 12 should be placed in a standby mode—i.e., shut down. When the engine 12 shuts down in the engine standby mode, some vehicle systems may remain running. Thus, a second power source, such as the battery 22, should be available to provide power to various vehicle subsystems when the engine 12 is in the standby mode. Moreover, it should be possible to start the engine 12 quickly upon driver demand. There may be times, however, when it is undesirable to allow the engine to pass into standby mode—e.g., if a second power source has a low state of charge, or if more power is needed. Therefore, the system 10 provides a way for various subsystems to be checked to determine whether the engine standby mode should be enabled.

Figure 2:
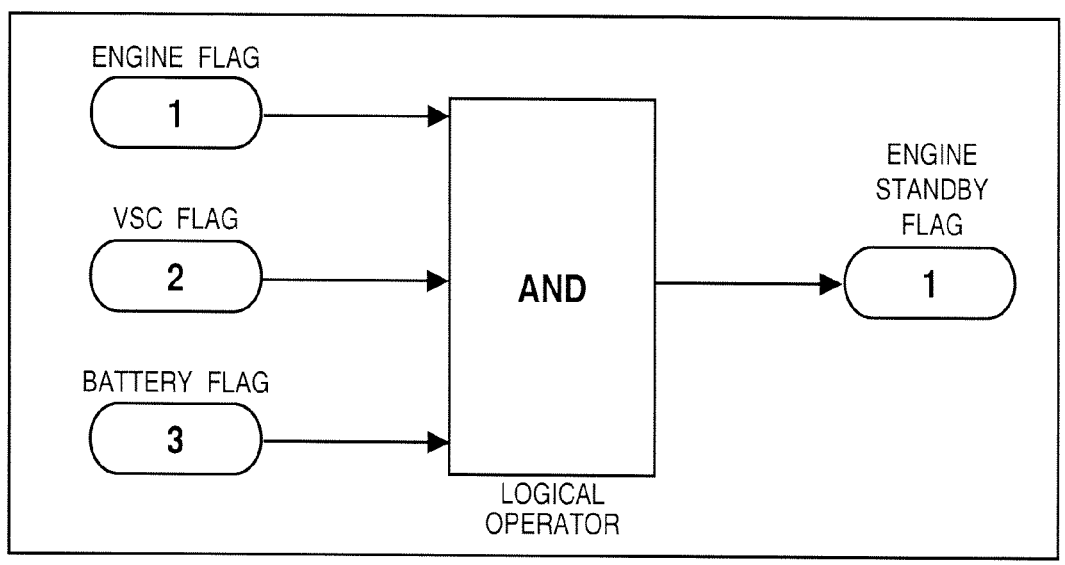
FIG. 2 is a schematic diagram showing the logic used to generate an engine standby flag.

Specifically, a number of conditions are compared to corresponding predetermined conditions, and flags are thereby generated. The flags are then used to generate an engine standby flag, which determines whether engine standby should be enabled. For example, as shown in FIG. 2, first, second, and third flags, corresponding to an engine flag, a vehicle system controller (VSC) flag, and a second power source, or battery flag, are generated. The block labeled "AND" is the logical operator used to determine whether the engine standby flag should be "true" or "false", where "true" indicates an engine standby enable condition. Of course, other logical operators may be used such that the engine standby enable flag would be "true" when less than all three flags indicate an engine standby enable condition.

To generate the various flags, certain conditions are compared to corresponding predetermined conditions. For example, the temperature of exhaust gases leaving the engine may be checked to determine if it meets or exceeds a predetermined temperature. When the exhaust gases are not warm enough, the engine flag may be "false", indicating an engine standby disable condition. Similarly, the battery may be checked for electrical faults or other problems, and compared to a predetermined condition to generate a battery flag. Of course, other types of engine and battery conditions may be checked, as desired. Each different condition checked can then be compared with a corresponding predetermined condition and used in a determination of whether the generated flag should be "true" or "false".

The various flags are generated by the control module that controls the individual subsystem or device. For example, the ECU 30 is configured to generate the engine flag, and the BMM 31 is configured to generate the battery flag. Similarly, the VSC flag is generated by the VSC 28; however, as explained below, the VSC flag may actually comprise a number of different flags. Each flag generated—e.g., the engine flag, the battery flag, and the VSC flag—is used by the VSC 28 to generate the engine standby flag.

Thus, the VSC 28 serves at least two distinct functions: first, it generates the VSC flag, which is one of a number of different flags used by the system 10, and second, it determines the engine standby flag by receiving inputs from the other control modules and implementing the engine standby logic. Of course, the system 10 is only one embodiment of the present invention, which contemplates that the engine standby logic may be programmed into a different controller, including an integrated controller that also contains the individual subsystem or device control modules.

Figure 3:
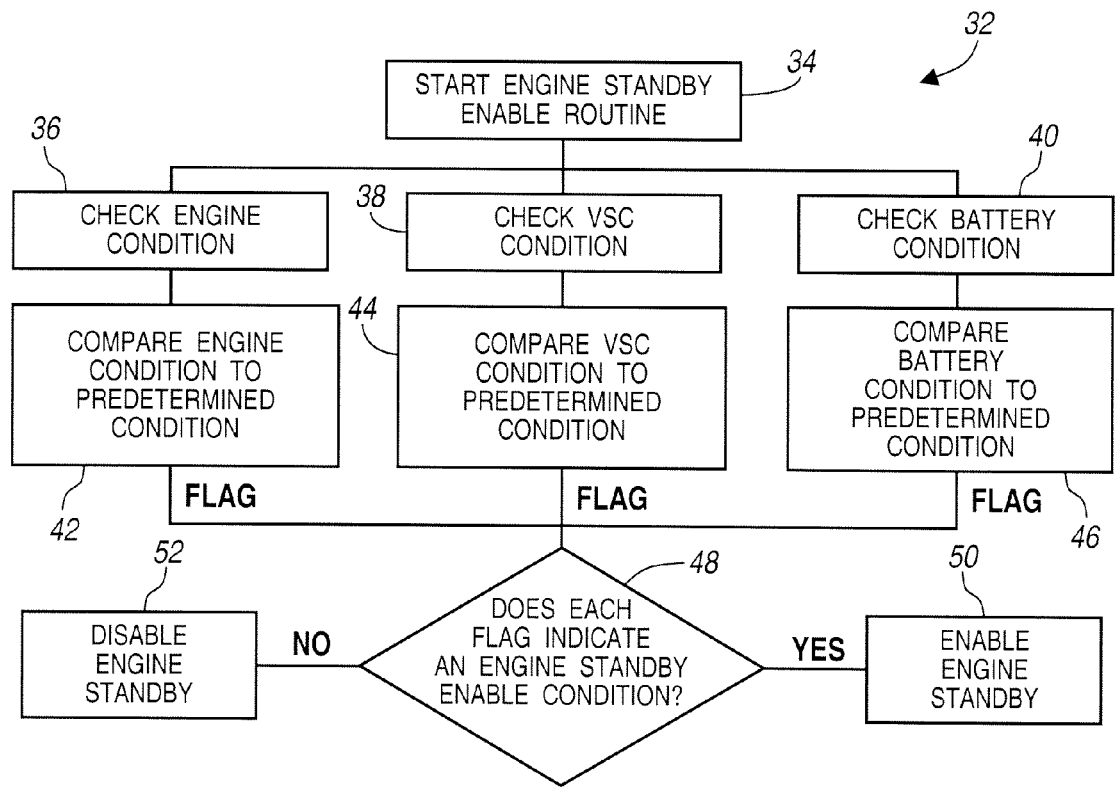
FIG. 3 is a flow chart illustrating the steps of a method performed in accordance with the present invention.

FIG. 3 shows a flow chart 32 diagramming the steps used to generate the engine standby flag. First, at step 34, the engine standby enable routine is started. This logic is programmed into the VSC 28; of course, the instruction set for this routine may reside in another controller that is in communication with the various vehicle subsystems. Initially, three types of conditions are checked: an engine condition, a VSC condition, and a battery condition, illustrated in Steps 36, 38 and 40, respectively. Each of the various conditions are compared to corresponding predetermined conditions, as illustrated in Steps 42, 44 and 46.

After these comparisons, flags are generated for each of the three different types of conditions, and the status of each of the flags is examined. Specifically, where the logical operator is an "AND" operator, such as shown in FIG. 2, it is determined whether each flag indicates an engine standby enable condition. This is illustrated in Step 48. If the answer to this query is yes, engine standby is enabled, as illustrated in Step 50. Conversely, if any one of the flags does not indicate an engine standby enable condition, then engine standby mode is disabled. This is illustrated in Step 52.

As noted above, generating the VSC flag is somewhat different from generating the other flags, in that the VSC flag may comprise more than one flag. Thus, the VSC 28 may actually compare a number of different kinds of conditions to corresponding predetermined conditions in order to generate the VSC flag. For example, the VSC 28 may determine whether driver-controlled conditions, vehicle conditions, and energy management conditions match corresponding predetermined conditions. The VSC flag may then indicate an engine standby enable condition when one or more of the determined conditions matches its corresponding predetermined condition. Thus, the term "VSC condition" may imply a condition of the sub-system or device controlled by the VSC 28, rather than a condition of the VSC 28 itself.

Figure 4:
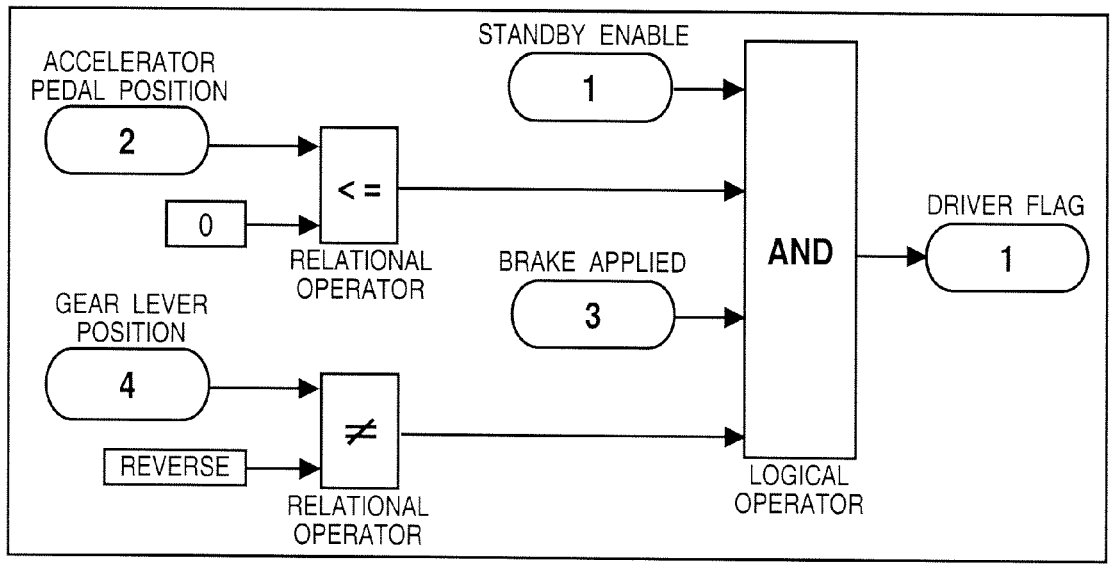
FIG. 4 is a schematic diagram showing various driver-controlled conditions to generate a driver flag.
Figure 5:
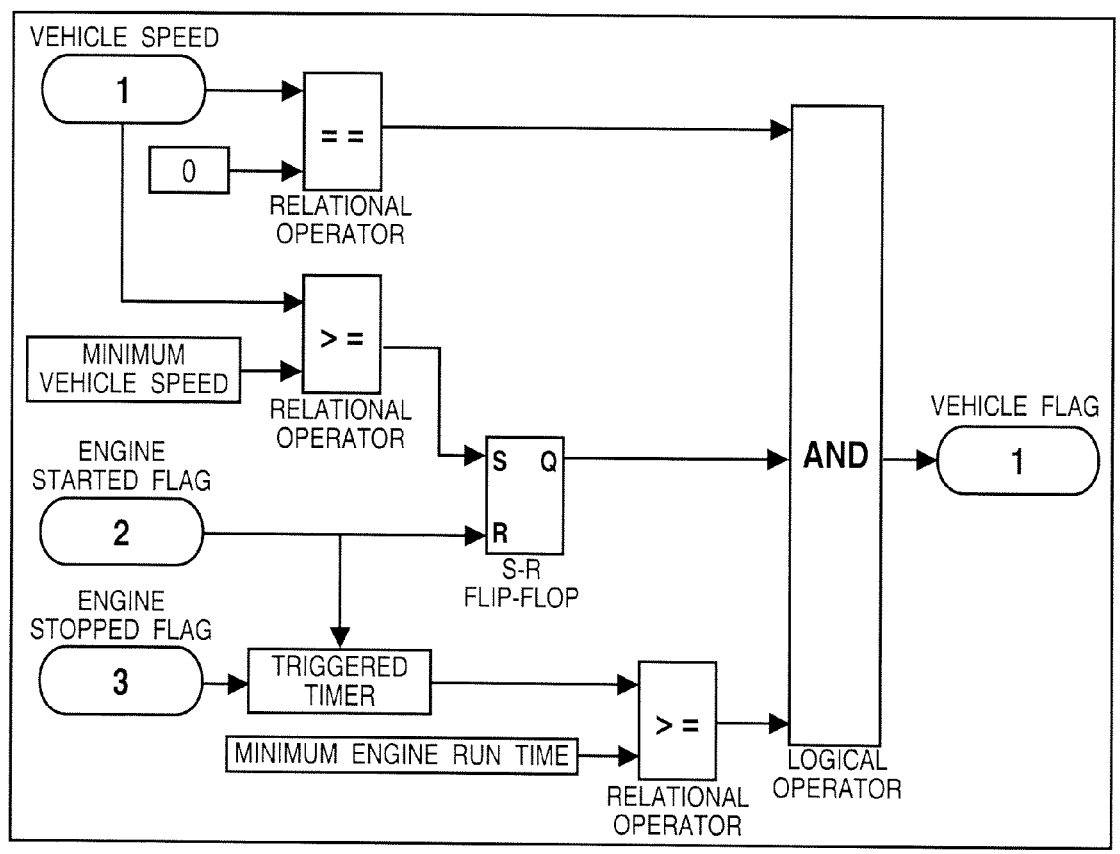
FIG. 5 is a schematic diagram showing various vehicle conditions used to generate a vehicle flag.
Figure 6:
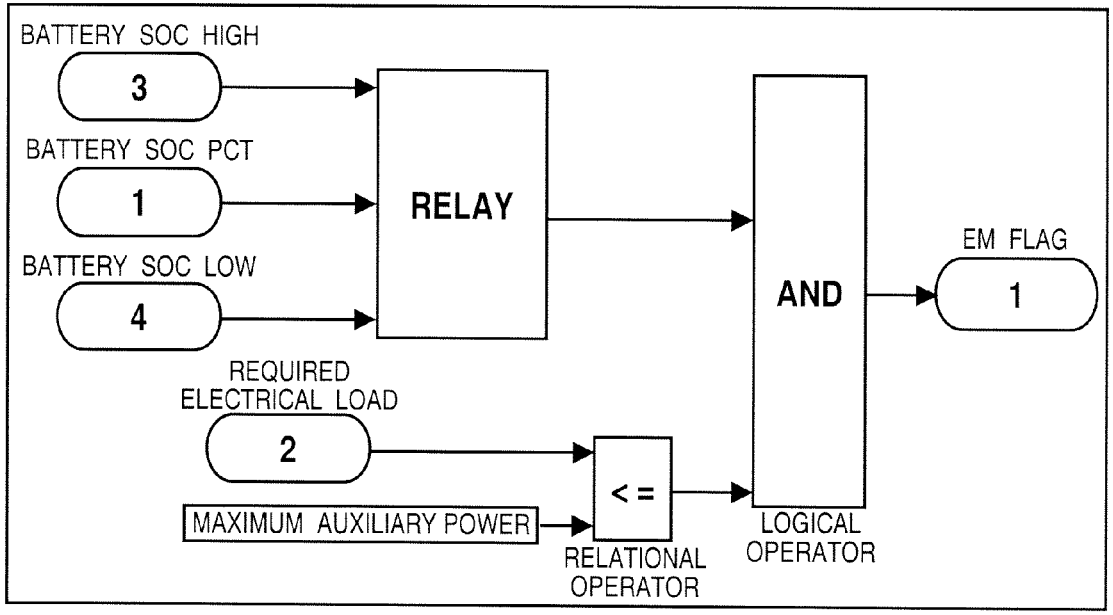
FIG. 6 is a schematic diagram showing various energy management conditions used to generate an energy management flag.

Each flag generated by the VSC 28—e.g., the driver flag, the vehicle flag, and the energy management flag—is illustrated in detail in FIGS. 4-6. For example, in order to generate the driver flag, the vehicle flag, and the energy management flag, various conditions are checked and compared to corresponding predetermined conditions, to determine whether the flag should indicate an engine standby enable condition.

Of course, the specific conditions that are checked, as well as the predetermined conditions to which they are compared, may vary. For example, in FIG. 4 various driver-controlled conditions are checked and compared to corresponding predetermined driver-controlled conditions, to generate a driver flag. In the example shown in FIG. 4, four different driver-controlled conditions are examined. Of course, there may be more or less driver-controlled conditions which are chosen for purposes of generating the driver flag.

In FIG. 4, the first driver-controlled condition illustrated is the position of a driver actuated switch, represented in FIG. 4 as "standby enable". The driver actuated switch may be placed in an instrument panel or other convenient location within the vehicle passenger compartment. This would allow a driver to manually enable or disable the engine standby mode. Thus, the position of the driver actuated switch is checked and compared to the known "on" and "off" positions.

Another driver-controlled condition that may be used in the engine standby enable routine is an accelerator pedal position. In particular, as shown in FIG. 4, the percentage that the accelerator pedal is depressed is checked against some predetermined level. In this example, the corresponding predetermined condition is zero—i.e., the accelerator pedal position is checked to determine whether it is in a completely released position. The relational operator used for this comparison is "less than or equal to" (<=). Of course, other relational operators may be used, and other predetermined conditions may be used for comparison, such that the accelerator pedal may be depressed to a certain extent, and still indicate an engine standby enable condition.

As shown in FIG. 4, a third driver-controlled condition is checked and compared to a corresponding predetermined condition. Specifically, the position of the brake pedal is checked, to ensure that it is depressed. Finally, the position of the gear lever is checked, since it may not be desirable, or even possible, to have engine standby enabled when the vehicle is in a particular gear. In the example shown in FIG. 4, the predetermined condition is a reverse gear, and the relational operator is "not equal to". Thus, the gear lever position will indicate an engine standby enabled condition only when the vehicle is not in a reverse gear. The logical operator used to compare each of the four inputs to determine the driver flag is "AND". Of course, other logical operators may be used, such that the driver flag may still indicate an engine standby enable condition when one or more of the driver-controlled condition inputs do not indicate an engine enable condition.

Similar to the evaluation of certain driver-controlled conditions, certain vehicle conditions are also examined when generating the VSC flag. FIG. 5 illustrates one set of vehicle conditions used to generate a vehicle flag, which is then subsequently used to generate the VSC flag. First, it is determined whether the vehicle speed is equal to zero—-i.e., whether the vehicle is completely stopped. In addition, another vehicle condition requires that the vehicle speed has to reach a minimum speed to enable the engine standby condition. This helps to avoid the undesirable situation of stopping and starting the engine too often, such as when the vehicle is maneuvered in a parking lot, or the vehicle is stopped in front of a traffic light and creeping.

To implement this condition, an "S—R Flip-Flop" is used. Specifically, once the maximum vehicle speed is greater than or equal to the minimum vehicle speed setting, the Flip-Flop is set, and engine standby is enabled. If the engine does stop, and later starts again, the signal "engine started flag" resets the Flip-Flop and disables the engine standby. The input "engine started flag" has a short pulse when the engine is started, and the vehicle must then reach at least the minimum vehicle speed before the engine standby condition is enabled.

As shown in FIG. 5, a third vehicle condition is used to generate the vehicle flag. Specifically, the engine must be running for a predetermined time before the engine standby will be enabled. This is implemented by using a triggered timer, for which, the trigger is the engine started flag pulse. The timer will be saturated and reset by another input, the engine stopped flag. Thus, the timer must indicate that the engine has been running for at least a minimum engine run time in order to indicate an engine standby condition. As with the previous examples, the logical operator used to compare each of the three vehicle conditions is an "AND" operator. Other operators may be used such that the vehicle flag may indicate an engine standby enable condition when less than all of the vehicle condition inputs indicate engine standby enable.

In addition to the driver-controlled conditions and vehicle conditions, various energy management conditions may also be examined and used to generate the VSC flag. FIG. 6 illustrates a number of the energy management conditions which can be used. In the example shown in FIG. 6, the first condition checked is the battery state of charge (SOC). In order to ensure that the battery SOC is above a predetermined level, a relay type logic is implemented. Engine standby is enabled until the battery SOC is depleted to a level set by "battery SOC low". Below this level, the engine is presumed to be started, and to be charging the battery to a higher level, set by "battery SOC high". The value of "battery SOC low" and "battery SOC high" may be predetermined calibration constants. They could also be variables set by another VSC function to reflect the coordination or optimization of the vehicle status.

The second energy management condition that is checked is the total electrical load on the battery 22. When the engine 12 is running, and the ISG 14 is in a generator mode, the ISG 14 not only charges the battery 22, but also provides electricity to all other vehicle electrical devices. If the engine 12 is to be put in the standby mode, and shut down, the battery 22 needs to provide power to all the electrical devices, as well as some devices that would otherwise be mechanically powered by the engine 12—e.g., a water pump and a transmission oil pump.

To determine whether the battery 22 can handle the power demands after the engine is shut down, the VSC 28 calculates an anticipated electrical load that will be present when the engine 12 is in the standby mode. This represents a required electrical load that the battery 22 will need to handle without assistance from the engine 12, the ISG 14, or a combination thereof. As illustrated in FIG. 6, the required electrical load is compared to a predetermined maximum electrical load, indicated by the "maximum auxiliary power" shown in FIG. 6. If the required electrical load is too great, it may be desirable to disable the engine standby mode because the battery 22 may be quickly depleted, thereby requiring the engine 12 to be restarted.

The predetermined value of the maximum auxiliary power may vary, depending on the ability of a second power source, such as the battery 22, to handle large electrical loads. Thus, the predetermined maximum auxiliary power may be set to a larger value when the vehicle's second power source is able to handle a relatively large electrical load. As with the driver flag and the vehicle flag, the energy management flag is generated using the "AND" logical operator flag. Thus, in the example shown in FIG. 6, the energy management flag will indicate an engine standby enable condition only when each of the inputs so indicate. Of course, different energy management conditions may be examined, and a different logical operator used, such that the energy management flag will indicate an engine standby enable condition under different sets of energy management conditions.

Figure 7:
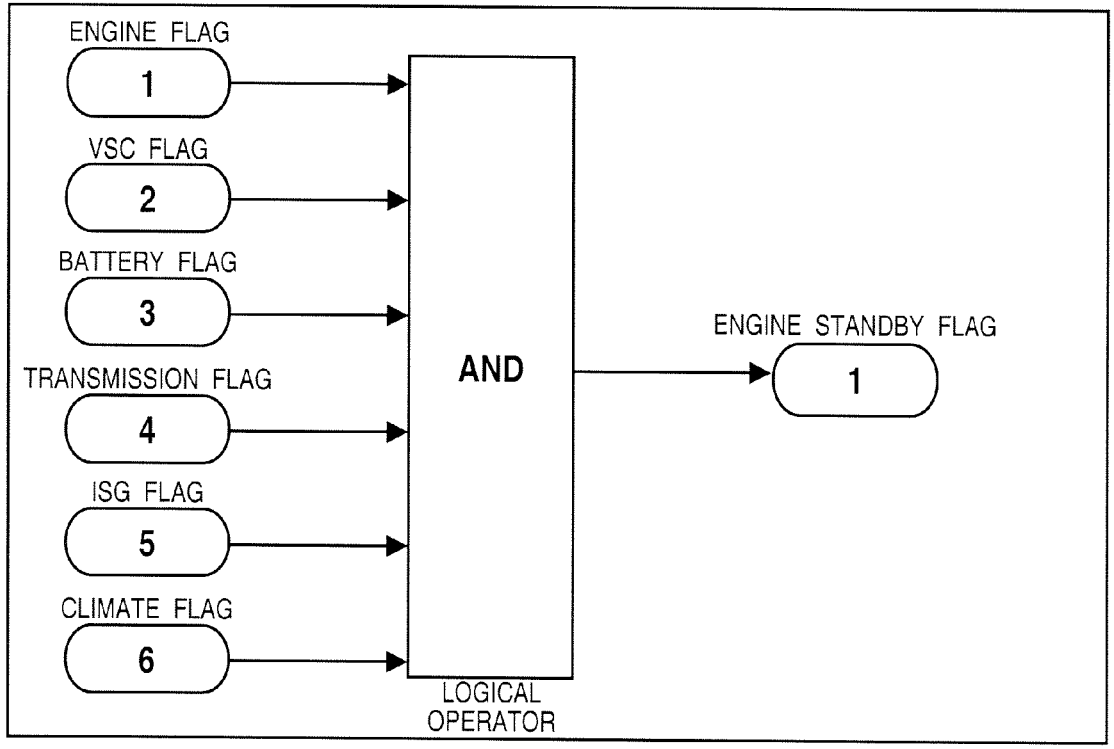
FIG. 7 is a schematic diagram showing the logic used to combine a number of additional flags to generate an engine standby flag.

As shown in FIG. 7, the VSC flag may be used in conjunction with a number of other flags to determine whether an engine standby mode should be enabled. Discussed above are the engine flag and the battery flag, which are generated by comparing engine and battery conditions to respective predetermined engine and battery conditions. Similarly, the temperature of the transmission oil may be checked against a predetermined temperature, and a transmission flag generated based on this comparison. Of course, other transmission conditions may be checked, as desired, and then compared to corresponding predetermined conditions and used to generate the transmission flag.

Also included in the embodiment shown in FIG. 7, are additional flags used to determine if engine standby should be enabled. An ISG flag is generated by checking at least one ISG condition and comparing it to a predetermined ISG condition. For example, the ISG may be examined for electrical faults, and if any are found, the ISG flag will indicate an engine standby disable condition.

In addition, a climate flag may be generated by examining the climate control system, such as the climate control system 24 shown in FIG. 1, to determine whether various conditions match corresponding predetermined conditions. For example, if the ambient air temperature is relatively high, and the climate control system is set to a relatively low temperature, this may indicate a need to continuously run an air conditioning compressor. Such an electrical load may quickly drain a battery, and so a climate flag may be generated that indicates an engine standby disable condition.

As discussed above in conjunction with the other flags, each of the flags shown in FIG. 7 may be generated by the control module that controls the individual subsystem, or by the VSC 28. For example, the transmission flag is generated by the TCU 20; whereas, the climate flag is generated by the VSC 28. Regardless of which control module is used to generate a particular flag, signals indicating each flag are sent to the VSC 28, where the logic to implement the engine standby flag resides.

In the example shown in FIG. 7, each of the six flags are compared using the "AND" logical operator to generate an engine standby flag. As discussed in conjunction with the VSC flag, different logical operators may be used such that the engine standby flag may indicate an engine standby enable condition when one or more of the input flags do not indicate an engine standby enable condition. In addition, it is important to note that the various conditions that are determined, and the predetermined conditions to which they are compared, may vary from vehicle to vehicle and across vehicle platforms.

While the best mode for carrying out the invention has been described in detail, those familiar with the art to which this invention relates will recognize various alternative designs and embodiments for practicing the invention as defined by the following claims.

The invention claimed is:

1. A method for determining when to stop an engine in a vehicle having a second power source, the method comprising:
   comparing at least one engine condition to a corresponding predetermined engine condition, thereby generating a first flag;
   comparing at least two vehicle system controller conditions to corresponding predetermined vehicle system controller conditions, thereby generating a second flag, the at least two vehicle system controller conditions including at least two vehicle conditions chosen from a set of vehicle conditions, the set of vehicle conditions including a current vehicle speed, a maximum vehicle speed since engine start, and an engine runtime,
   the step of comparing at least two vehicle system controller conditions to corresponding predetermined vehicle system controller conditions including: comparing the maximum vehicle speed since engine staff to a predetermined minimum vehicle speed, and comparing the engine runtime to a predetermined runtime, the generated second flag indicating an engine standby enable condition only when at least one of the maximum vehicle speed since engine staff is greater than the predetermined minimum vehicle speed, or the engine runtime is greater than the predetermined runtime;
   comparing at least one second power source condition to a corresponding predetermined second power source condition, thereby generating a third flag; and
   stopping the engine when at least one of the flags indicates an engine stop condition.

2. The method of claim 1, wherein the first flag indicates an engine stop condition when at least one of the at least one engine conditions matches a corresponding predetermined engine condition, the second flag indicates an engine stop condition when at least one of the at least two vehicle system controller conditions matches a corresponding predetermined vehicle system controller condition, and the third flag indicates an engine stop condition when at least one of the at least one second power source conditions matches a corresponding predetermined second power source condition.

3. The method of claim 1, wherein the at least two vehicle system controller conditions further includes at least one driver-controlled condition chosen from a set of driver-controlled conditions, the set of driver-controlled conditions including a driver actuated switch position, an accelerator pedal position, a brake pedal position, and a gear lever position.

4. The method of claim 3, wherein the predetermined vehicle system controller conditions include predetermined driver-controlled conditions, the predetermined driver-controlled conditions including the driver actuated switch in an enable position, the accelerator pedal in a completely released position, the brake pedal in a depressed position, and the gear lever not in a reverse position.

5. The method of claim 1, wherein the predetermined vehicle system controller conditions include the current vehicle speed being approximately zero.

6. The method of claim 1, wherein the at least two vehicle system controller conditions further include at least one energy management condition chosen from a set of energy management conditions, the set of energy management conditions including a second power source state of charge and a required electrical load.

7. The method of claim 6, wherein the predetermined vehicle system controller conditions include predetermined energy management conditions, the predetermined energy management conditions including the state of charge being greater than a predetermined minimum state of charge, and the required electrical load being at or below a predetermined maximum electrical load.

8. The method of claim 1, wherein the vehicle includes a transmission, a motor, and a climate control system, the method further comprising:
   comparing at least one transmission condition to a corresponding predetermined transmission condition, thereby generating a transmission flag;
   comparing at least one motor condition to a corresponding predetermined motor condition, thereby generating a motor flag; and
   comparing at least one climate control condition to a corresponding predetermined climate control condition, thereby generating a climate flag.

9. The method of claim 8, wherein the engine is stopped only when each of the flags indicates an engine stop condition.

10. The method of claim 1, further comprising prohibiting stopping the engine when at least one of the flags does not indicate an engine stop condition.

11. The method of claim 1, wherein the step of comparing at least two vehicle system controller conditions to corresponding predetermined vehicle system controller conditions further includes comparing the current vehicle speed to a predetermined vehicle speed.

12. A method for enabling engine standby in a vehicle having an engine, a motor, and a battery, the method comprising:
   determining whether at least one engine condition matches a corresponding predetermined engine condition;
   determining whether at least two vehicle system controller conditions match corresponding predetermined vehicle system controller conditions, the at least two vehicle system controller conditions including at least two vehicle conditions chosen from a set of vehicle conditions, the set of vehicle conditions including a current vehicle speed, a maximum vehicle speed since engine start, and an engine runtime, the step of determining whether at least two vehicle system controller conditions match corresponding predetermined vehicle system controller conditions including: determining whether the maximum vehicle speed since engine start is greater than a predetermined minimum vehicle speed, and determining whether the engine runtime is greater than a predetermined runtime;

determining whether at least one second power source condition matches a corresponding predetermined second power source condition; and enabling engine standby when at least one of the determined conditions matches a corresponding predetermined condition.

13. The method of claim 12, wherein the vehicle includes a transmission and a climate control system, the method further comprising:

determining whether at least one transmission condition matches a corresponding predetermined transmission condition;

determining whether at least one motor condition matches a corresponding predetermined motor condition; and determining wether at least one climate control condition matches a corresponding predetermined climate control condition.

14. The method of claim 13, wherein engine standby is enabled only when each of the determined conditions matches a corresponding predetermined condition.

15. The method of claim 12, wherein the at least two vehicle system controller conditions further include at least one driver-controlled condition and at least one energy management condition; and wherein the predetermined vehicle system controller conditions include predetermined driver-controlled conditions and predetermined energy management conditions.

16. The method of claim 15, wherein the at least one driver-controlled condition is chosen from a set of driver-controlled conditions, the set including a driver actuated switch position, an accelerator pedal position, a brake pedal position, and a gear lever position; and the at least one energy management condition is chosen from a set of energy management conditions, the set including a battery state of charge and a required electrical load.

17. The method of claim 16, wherein the predetermined driver-controlled conditions include the driver actuated switch in an enable position, the accelerator pedal in a completely released position, the brake pedal in a depressed position, and the gear lever not in a reverse position;

the predetermined vehicle conditions further include the current vehicle speed being approximately zero; and the predetermined energy management conditions include the battery state of charge being greater than a predetermined minimum state of charge, and the required electrical load being at or below a predetermined maximum electrical load.

18. The method of claim 12, further comprising disabling engine standby when at least one of the determined conditions does not match a corresponding predetermined condition.

19. A method for enabling engine standby in a vehicle having an engine, a motor, and a battery, the method comprising:

starting an engine standby enable routine;

determining whether at least one engine condition matches a corresponding predetermined engine condition;

determining whether at least two vehicle system controller conditions match corresponding predetermined vehicle system controller conditions, the at least two vehicle system controller conditions including at least two vehicle conditions chosen from a set of vehicle conditions, the set of vehicle conditions including a current vehicle speed, a maximum vehicle speed since engine start, and an engine runtime, the step of determining whether at least two vehicle system controller conditions match corresponding predetermined vehicle system controller conditions including: determining whether the maximum vehicle speed since engine start is greater than a predetermined minimum vehicle speed, and determining whether the engine runtime is greater than a predetermined runtime; and enabling engine standby when at least one of the determined conditions matches a corresponding predetermined condition.

20. The method of claim 19, wherein the step of enabling engine standby occurs only when at least the at least one engine condition matches a corresponding predetermined engine condition and at least one of the at least two vehicle system controller condition matches a corresponding predetermined vehicle system controller condition.

* * * * *